United States Patent
O'Kane

(10) Patent No.: US 10,890,021 B2
(45) Date of Patent: Jan. 12, 2021

(54) DOORLOCK SAFETY CHAIN RELEASE MECHANISM

(71) Applicant: Patrick Robert O'Kane, New Maryland (CA)

(72) Inventor: Patrick Robert O'Kane, New Maryland (CA)

( * ) Notice: Subject to any disclaimer, the term of this patent is extended or adjusted under 35 U.S.C. 154(b) by 484 days.

(21) Appl. No.: 15/932,480

(22) Filed: Mar. 6, 2018

(65) Prior Publication Data

US 2018/0283063 A1    Oct. 4, 2018

Related U.S. Application Data

(66) Substitute for application No. 62/601,804, filed on Apr. 3, 2017.

(51) Int. Cl.
  *E05C 17/36*   (2006.01)
  *F16B 21/16*   (2006.01)

(52) U.S. Cl.
  CPC .......... *E05C 17/365* (2013.01); *F16B 21/165* (2013.01)

(58) Field of Classification Search
  CPC ...... E05C 17/365; E05C 17/00; E05C 17/166; Y10T 292/283; Y10T 24/4501; Y10T 292/28; Y10S 292/46; Y10S 292/15; Y10S 292/53; Y10S 292/65
  See application file for complete search history.

(56) References Cited

U.S. PATENT DOCUMENTS

| | | |
|---|---|---|
| 242,568 A | 6/1881 | Sparks |
| 252,309 A | 1/1882 | Goebel |
| 832,420 A | 10/1906 | Rinaldy |
| 1,711,771 A | 5/1929 | Bourque |
| 1,777,146 A | 9/1930 | McGlaughlin |
| 1,824,045 A | 9/1931 | Fetyk |
| 2,010,277 A | 8/1935 | Smith |
| 2,087,755 A | 7/1937 | Dayton |
| 2,105,714 A | 1/1938 | West |
| 2,480,662 A | 8/1949 | McKinzie |
| 2,642,689 A | 6/1953 | Cline |
| 2,724,257 A | 11/1955 | Segal |
| 2,779,228 A | 1/1957 | Meepos et al. |
| 2,970,465 A | 2/1961 | Falk, Jr. et al. |
| 2,981,090 A | 4/1961 | Patriquin et al. |

(Continued)

FOREIGN PATENT DOCUMENTS

EP    0352948    1/1990

*Primary Examiner* — Mark A Williams
(74) *Attorney, Agent, or Firm* — Mario Theriault

(57) ABSTRACT

The doorlock safety chain release mechanism comprises an anchor fixture mounted to a door frame and a door plate assembly mounted to the door. The door plate assembly has a horizontal channel with a horizontal slot in the front wall of the channel. A chain has one end thereof attached to the anchor fixture and a release connector is mounted to the other end. A slider is mounted in the channel. The release connector has a ball-detent connector mounted therein, and engaged into the slider. The ball-detent connector is operable by depressing the plunger of the connector through the slider and into a hole in the backing plate of the channel. An operation of the ball-detent connector is checked by the backing plate when the plunger is unaligned with the hole in the backing plate. Applications for this lock mechanism are not limited to door locks.

6 Claims, 2 Drawing Sheets

(56) References Cited

U.S. PATENT DOCUMENTS

| | | | |
|---|---|---|---|
| 3,004,419 A | 10/1961 | Falk, Jr. | |
| 3,085,462 A | 4/1963 | Myers | |
| 3,275,364 A | 9/1966 | Quinn | |
| 3,276,799 A | 10/1966 | Moore et al. | |
| 3,397,000 A * | 8/1968 | Nakanishi | E05B 65/0864 |
| | | | 292/61 |
| 3,493,256 A | 2/1970 | Ramler | |
| 3,608,962 A * | 9/1971 | Knecht | A44B 11/2534 |
| | | | 297/483 |
| 3,788,107 A | 1/1974 | Lippman | |
| 3,793,685 A * | 2/1974 | Knecht | F16B 21/165 |
| | | | 24/651 |
| 3,936,085 A | 2/1976 | Long | |
| 3,944,268 A | 3/1976 | Gonzalez et al. | |
| 4,013,311 A * | 3/1977 | Prezioso | E05C 19/003 |
| | | | 292/59 |
| 4,027,907 A | 6/1977 | Crepinsek | |
| 4,027,908 A * | 6/1977 | Crepinsek | E05C 17/365 |
| | | | 292/264 |
| 4,054,310 A | 10/1977 | Coopersmith | |
| 4,073,523 A | 2/1978 | Long | |
| 4,079,973 A * | 3/1978 | Hollins | E05C 17/365 |
| | | | 292/264 |
| 4,082,333 A | 4/1978 | Segal | |
| 4,105,231 A * | 8/1978 | Huyssen | E05C 17/365 |
| | | | 292/264 |
| 4,296,957 A | 10/1981 | Belles | |
| D274,125 S * | 6/1984 | Hardesty | D8/340 |
| 4,472,143 A | 9/1984 | Bennett et al. | |
| 4,482,177 A * | 11/1984 | Nagy | E05C 17/00 |
| | | | 292/150 |
| 4,600,226 A | 7/1986 | Christen et al. | |
| 4,622,726 A | 11/1986 | Nakamura | |
| 4,815,305 A * | 3/1989 | Smith | E05C 17/365 |
| | | | 292/264 |
| 4,832,386 A * | 5/1989 | Sweet | E05B 15/0205 |
| | | | 292/264 |
| 4,898,411 A | 2/1990 | Ocello et al. | |
| 4,988,248 A | 1/1991 | Flux | |
| 5,152,563 A | 10/1992 | Fontenot | |
| 5,285,666 A | 2/1994 | Bartnicki | |
| 5,669,256 A | 9/1997 | Chung | |
| 7,891,903 B2 | 2/2011 | Klingenberg et al. | |
| 7,954,211 B2 | 6/2011 | De Bien | |
| 8,516,732 B2 | 8/2013 | Burnsed, Jr. | |

\* cited by examiner

DOORLOCK SAFETY CHAIN RELEASE MECHANISM

The present application claims the benefit of U.S. Provisional Application No. 62/601,804, filed Apr. 3, 2017.

TECHNICAL FIELD

The present invention pertains to the field of door locks, and more particularly, it pertains to a release connector for a doorlock safety chain.

BACKGROUND

Doorlock safety chains are well known and have been used for a long time. A safety chain allows a resident to partially open a door to talk to an unknown visitor while holding the door in a safe position between the resident and the visitor.

A doorlock safety chain must be easy to operate by the resident, but must resist the manipulation thereof by a burglar using an improvised tool.

The following publications provide a partial inventory of the different doorlock safety chains that can be found in the prior art.

U.S. Pat. No. 242,568 issued to W. E. Sparks on Jun. 7, 1881;
U.S. Pat. No. 252,309 issued to C. H. Goebel on Jan. 17, 1882;
U.S. Pat. No. 832,420 issued to E. S. Rinaldy on Oct. 2, 1906;
U.S. Pat. No. 1,777,146 issued to W. M. McGlaughlin on Sep. 30, 1930;
U.S. Pat. No. 1,824,045 issued to J. Fetyk on Sep. 22, 1931;
U.S. Pat. No. 2,087,755 issued to C. R. Dayton on Jul. 20, 1937;
U.S. Pat. No. 2,105,714 issued to F. R. West on Jan. 18, 1938;
U.S. Pat. No. 2,724,257 issued to S. Segal on Nov. 22, 1955;
U.S. Pat. No. 2,970,465 issued to M. Falk, Jr., et al., on Feb. 7, 1961;
U.S. Pat. No. 2,981,090 issued to G. P. Patriquin et al., on Apr. 25, 1961;
U.S. Pat. No. 3,004,419 issued to M. Falk, Jr., on Oct. 17, 1961;
U.S. Pat. No. 3,275,364 issued to B. A. Quinn on Sep. 27, 1966;
U.S. Pat. No. 3,493,256 issued to D. A. Ramler on Feb. 3, 1970;
U.S. Pat. No. 3,788,107 issued to A. H. Lippman on Jan. 29, 1974;
U.S. Pat. No. 3,936,085 issued to D. L. Long on Feb. 3, 1976;
U.S. Pat. No. 3,944,268 issued to D. A. Gonzalez et al., on Mar. 16, 1976;
U.S. Pat. No. 4,013,311 issued to R. L. Prezioso on Mar. 22, 1977;
U.S. Pat. No. 4,027,907 issued to A. Crepinsek on Jun. 7, 1977;
U.S. Pat. No. 4,027,908 issued to A. Crepinsek on Jun. 7, 1977;
U.S. Pat. No. 4,054,310 issued to L. Coopersmith on Oct. 18, 1977;
U.S. Pat. No. 4,073,523 issued to D. L. Long on Feb. 14, 1978;
U.S. Pat. No. 4,079,973 issued to J. R. Hollins on Mar. 31, 1978;
U.S. Pat. No. 4,082,333 issued to B. C. Segal on Apr. 4, 1978;
U.S. Pat. No. 4,105,231 issued to P. H. Huyssen on Aug. 8, 1978;
U.S. Pat. No. 4,296,957 issued to D. E. Belles on Oct. 27, 1981;
U.S. Pat. No. D 274,125 issued to K. A. Hardesty et al., on Jun. 5, 1984;
U.S. Pat. No. 4,472,143 issued to H. G. Bennett et al., on Sep. 18, 1984;
U.S. Pat. No. 4,482,177 issued to D. L. Nagy on Nov. 13, 1984;
U.S. Pat. No. 4,600,226 issued to C. R. Christen et al., on Jul. 15, 1986;
U.S. Pat. No. 4,898,411 issued to D. M. Ocello et al., on Feb. 6, 1990;
U.S. Pat. No. 5,152,563 issued to A. M. Fontenot on Oct. 6, 1992;
U.S. Pat. No. 5,285,666 issued to A. W. Bartnicki on Feb. 15, 1994;
U.S. Pat. No. 5,669,256 issued to K-C Chung on Sep. 23, 1997.

Similarly, detachable connectors for separating a chain, a cable or other tethers from itself or from an attachment point are well known in the art. Again, a good inventory of release connectors found in the prior art can be appreciated from the following publications.

U.S. Pat. No. 1,711,771 issued to D. Bourque on May 7, 1929;
U.S. Pat. No. 2,010,277 issued to W. L. Smith on Aug. 6, 1935;
U.S. Pat. No. 2,480,662 issued to P. V. McKinzie on Aug. 30, 1949;
U.S. Pat. No. 2,642,689 issued to J. L. Cline on Jun. 23, 1953;
U.S. Pat. No. 2,779,228 issued to D. Meepos et al., on Jan. 29, 1957;
U.S. Pat. No. 3,085,462 issued to P. D. Myers on Apr. 16, 1963;
U.S. Pat. No. 3,276,799 issued to C. L. Moore et al., on Oct. 4, 1966;
U.S. Pat. No. 3,608,962 issued to H. G. Knecht on Sep. 28, 1971;
U.S. Pat. No. 3,793,685 issued to H. G. Knecht on Feb. 26, 1974;
U.S. Pat. No. 4,622,726 issued to T. Nakamura on Nov. 18, 1986;
U.S. Pat. No. 4,988,248 issued to P. R. Flux on Jan. 29, 1991;
U.S. Pat. No. 7,891,903 issued to J. C. Klingenberg et al., on Feb. 22, 2011;
U.S. Pat. No. 7,954,211 issued to H. DeBien on Jun. 7, 2011;
U.S. Pat. No. 8,516,732 issued to A. A. Burnsed, Jr., on Aug. 27, 2013.

As can be appreciated, many doorlock safety chains from the prior art were too complicated to operate without instructions and therefore, these devices never enjoyed a lasting success. For example, the separable connector in U.S. Pat. No. 252,309 issued to C. H. Goebel, has appeal for its push-to-release action on a separable button. However, this connector must be moved to the far end of the slot in the door plate and rotated exactly 90° to allow its separation from the door plate. It is believed that this combined movement was too complicated for the average person and therefore, this type of doorlock did not enjoy a large market appeal.

Despite the inconvenience described above, it is believed that a market demand exists for a doorlock safety chain having push-to-release connector. Ball-detent-type connectors are well known in the art for being used on key holders, and other chains and straps attached to common articles. These connectors are easy to understand at first glance, and easy to operate by any member of the general public.

Therefore, it is believed that a market demand exists for a doorlock safety chain having an end connector of the ball-detent type. It is believed that a market demand exists for a doorlock safety chain using a ball-detent connector that cannot be undone by a burglar using an improvised implement.

SUMMARY

In the present invention, there is provided a doorlock safety chain having a push-to-release connector. The connector can only be undone with the door completely closed, by someone having visual access to it.

In a first aspect of the present invention, there is provided a doorlock safety chain release mechanism comprising an anchor fixture mounted to a frame of a door, and a door plate assembly mounted to the door at a same height as the anchor fixture. The door plate assembly has an embossed cover plate and a backing plate. The embossed cover plate defines a horizontal channel and a horizontal slot therein. The backing plate has a hole therein aligning with a far end of the slot. There is also included a chain extending between the anchor fixture and the door plate assembly. One end of the chain is attached to the anchor fixture and a release connector is mounted to the other end. A slider is mounted in the channel, and this slider has a cylindrical cavity throughout a thickness thereof. A release connector of the ball-detent type is engaged into the cylindrical cavity of the slider. The connector is operable and released by depressing the stem or plunger through the cylindrical cavity of the slider and into the hole in the backing plate. An operation of the ball-detent connector is checked by the backing plate when the stem is unaligned with the hole in the backing plate.

In another aspect of the present doorlock, the safety chain has no excess length, so it must be pulled as a straight line to align the connector with the far end of the slot in the door plate assembly.

Because of the precise alignment of the connector with the hole at the far end of the slot of the door plate assembly, and the precise length of the safety chain, it becomes extremely difficult to operate this doorlock without being directly facing the doorlock.

The horizontal alignment of the chain and the registration of the stem into a hole in a backing plate represent complex movements that cannot be done by someone standing outside the door.

In yet another aspect of the present invention, there is provided a lock release mechanism comprising, a release connector and a channel assembly including a channel having a longitudinal dimension and slider movably mounted therein for movement along the longitudinal dimension. The slider assembly has a cavity extending through a thickness thereof, and that cavity is configured to receive the release connector therein. The channel assembly also comprises a backing plate enclosing the channel along the longitudinal dimension and a sliding surface retaining the slider in the channel. The backing plate has a hole therein aligning with the cavity in the slider when the slider is at a specific location along the longitudinal dimension. The connector has a ball-detent mechanism and a plunger for operating the ball-detent mechanism. The release connector is mounted in the cavity of the slider, for movement with the slider along the channel. The plunger is extendable into the hole in the backing plate when the cavity of the slider is aligning with the hole in the backing plate, for operating the ball-detent mechanism and releasing the connector from the slider. A movement of the plunger is checked by the backing plate when the cavity in the slider is positioned offset from the hole in the backing plate.

This lock release mechanism can be used in applications other than door locks. This lock mechanism can be adapted for child-proofing storage cabinets for example, to protect a child from access to working implements and kitchen appliances.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

The preferred embodiment of the preferred doorlock safety chain release mechanism according to the present invention is described herein-below with reference to the attached drawings.

Figure 1:
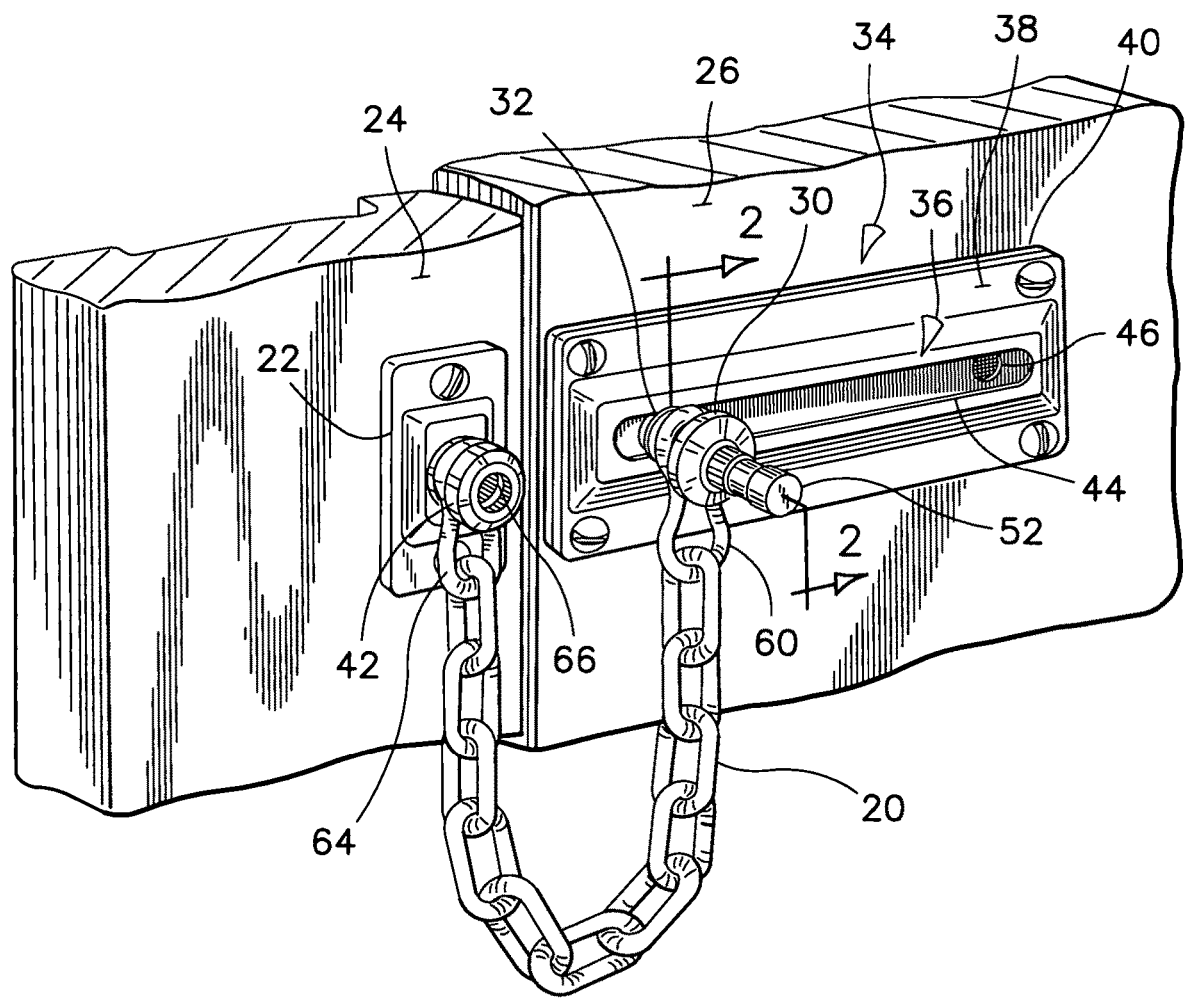
FIG. 1 is a partial perspective view of a doorlock safety chain having a push-to-release connector.

Referring to FIG. 1, the overall arrangement of the preferred mechanism is illustrated. The preferred mechanism comprises a safety chain 20 that has a first end attached to an anchor fixture 22. The anchor fixture 22 is mounted to the frame 24 of a door 26. The movable end of the chain 20 has a ball-detent-type connector 30 attached to it. This connector 30 is made to engage into a slider 32, which is better illustrated in FIGS. 2 and 3. The slider 32 is held captive in a door plate assembly 34 and it is free to slide along a slotted channel 36 in the door plate assembly 34.

The door plate assembly 34 is affixed to the door 26 at a same height as the anchor fixture 22. The door plate assembly 34 is made of an embossed cover plate 38 and a backing plate 40. The cover plate 38 and the backing plate 40 define the slotted channel 36 along which the slider 32 can move. The slotted channel 36 guides the movement of the connector 30 and the slider 32 toward and away from the anchor fixture 22.

A socket 42 is mounted to the anchor fixture 22 to retain the connector 30 to the anchor fixture 22 when the safety chain 20 is not used.

Referring again to FIG. 1, the channel 36 in the door plate 34 has a horizontal, longitudinal slot 44 therein. The far end of the backing plate 40 as a hole 46 therein. The hole 46 preferably aligns with the far end of the slot 44. The hole 46 may extend into the surface of the door 26.

Figure 2:
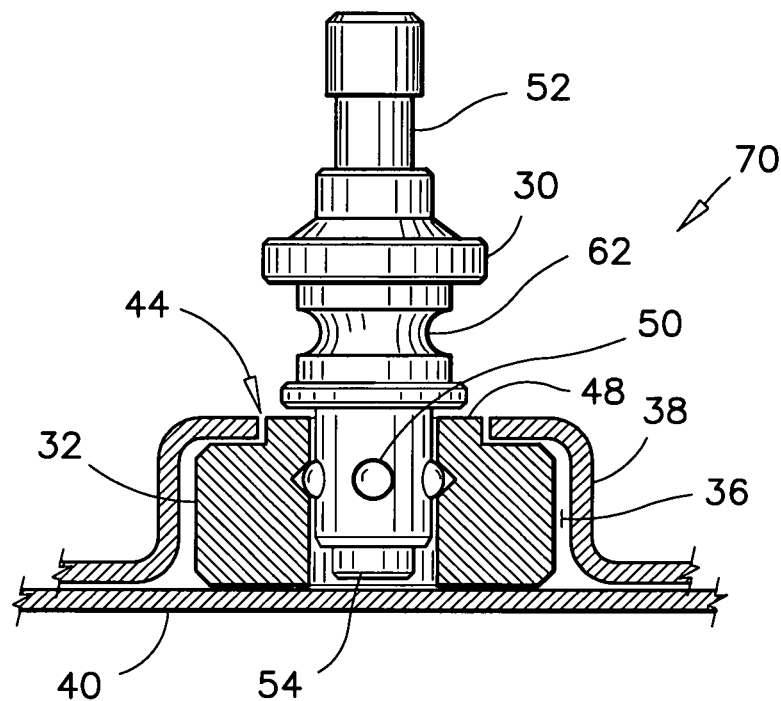
FIG. 2 is a cross-section view of the connector in FIG. 1, as seen along line 2-2 in FIG. 1.
Figure 3:
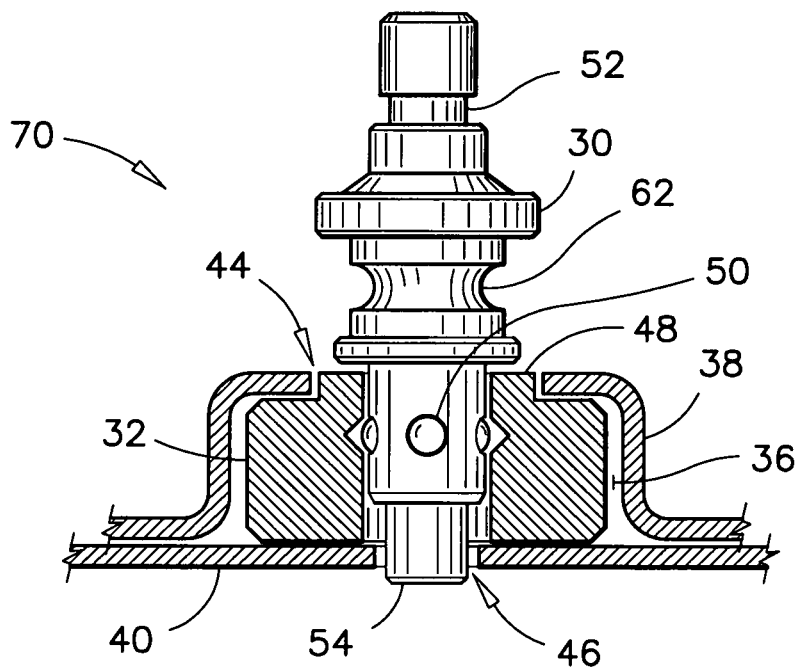
FIG. 3 is another cross-section of the connector in FIG. 1, when positioned at the far end of the slot in the door plate assembly in FIG. 1, with the stem or plunger of the connector depressed to release the connector.

Referring now to FIGS. 2 and 3, operation of the preferred doorlock safety chain release mechanism will be explained.

The slider 32 has a cylindrical cavity extending throughout its thickness, for receiving the release connector 30 therein. The slider 32 is preferably guided along the slot 44 by way of a shoulder 48 on the slider 32. This shoulder extends into the slot 44 and its diameter is a free-sliding fit relative to the width of the slot 44.

The preferred release connector 30 comprises a ball-detent-type lock 50 therein. The internal structure and operation of this ball-detent mechanism 50 is not explained or illustrated herein in details, as this is not the focus of the present invention. These mechanisms are well known in the art of chain connectors.

However, the type of ball-detent connector 30 used in the preferred embodiment has a movable stem or plunger 52. The preferred connector 30 has a stem extension 54 that extends flush with the surface of the backing plate 40 when the stem is in a relaxed mode, as illustrated in FIG. 2. The stem extension 54 of the connector 30 is sufficiently long to extend into the hole 46 in the backing plate 40, when the stem extension 54 is in a depressed mode, as illustrated in FIG. 3. This depressed mode enables the release of the ball-detent mechanism 50 and the separation of the connector 30 from the slider 32.

Because of the stem or plunger extension 54 and the hole 46 registering with the stem extension 54, the preferred doorlock safety chain release mechanism can only be undone by pressing on the stem 52 when the slider 32 is at a precise location at the far end of the slot 44, to register the stem or plunger extension 54 into the hole 46.

The chain 20 has a specific length that is equivalent to about a straight line between the anchor fixture 22 and the hole 46 in the door plate assembly 34. The chain 20 must be pulled as a straight line with no sag therein, to reach that location. It will be appreciated that the door 26 must be shut tight in order to obtain this tight-chain condition. The combination of this tight-chain condition and the hole-stem registration, represents complex and complementary movements that are impossible to perform by someone standing outside the door using fabricated improvised implements.

Referring to the drawings, the chain 20 is connected to the connector 30 by a last chain link 60 which is formed to movably sit into a groove 62 in the body of the connector 30. Similarly, the chain 20 is connected to the anchor fixture 22 by a first link 64 that is formed to movably sit into similar groove (not shown) around the socket 42 on the anchor fixture 22. The socket 42 has a cylindrical opening therein to receive and to retain the body of the connector 30 when the safety chain is not used. Furthermore, the cylindrical opening in the socket 42 has an internal circular groove 66 therein to retain the ball-detent mechanism 50 in the socket 42.

In a broader aspect, the lock mechanism 70 as illustrated in FIGS. 2 and 3, can be used without the chain 20, or with a tether other than a chain. The hole 46 can be located anywhere along the slot 44. Also, the door plate assembly 34 can be installed in a vertical alignment, or at any other angle without compromising the operation of the lock mechanism 70. It is believe that this lock mechanism 70 can be used on cabinet doors and dresser drawers; on lids of boxes and storage chests; on the latches of appliance and tool cases, and on closures of pouches and holsters.

What is claimed is:

1. A doorlock safety chain release mechanism comprising:
   a chain having a first end and a second end;
   an anchor fixture mountable to a frame of a door; said anchor fixture being attached to said first end of said chain;
   a door plate assembly mountable to a door; said door plate assembly comprising a release connector removably mounted thereto; said release connector comprising a stem being connected to said second end of said chain;
   said door plate assembly comprising an embossed cover plate and a backing plate mounted to said embossed cover plate; said embossed cover plate and said backing plate defining an elongated channel;
   said channel having an elongated straight slot along said embossed cover plate, and
   said backing plate having a hole there through aligning with one end of said slot;
   said release connector also comprising:
   a slider mounted in said channel and being configured for movement along said slider having a cylindrical cavity there through extending at a right angle from a plan of said slot; and
   said stem of said release connector extending through said slot and through said cylindrical cavity of said slider; said stem and said slider jointly comprising a ball-detent mechanism; said slider and said stem being configured for movement along said slot for positioning said stem over said hole such that said stem being extendable into said hole; said stem, said hole and said slider being configured for releasing said ball-detent mechanism when said stem is extended into said hole and for allowing a withdrawal of said stem and said second end of said chain from said slider and from said door plate assembly.

2. The doorlock safety chain release mechanism as claimed in claim 1, wherein when said anchor fixture and said door plate assembly being positioned side by side without touching, with said elongated slot in said door plate assembly extending horizontally with said hole being positioned at a far end of said slot relative to said anchor fixture, and when said stem extending in said hole, a length of said chain being equivalent to a dimension between said hole and said anchor fixture.

3. The doorlock safety chain release mechanism as claimed in claim 1, wherein said stem has a first circular groove thereabout and said chain has a first chainlink formed on said second end thereof and being configured for mounting into said first circular groove.

4. The doorlock safety chain release mechanism as claimed in claim 3, wherein said anchor fixture has a socket mounted thereto, and said socket having a second circular groove thereabout, and said chain has a second chainlink formed on said first end thereof and being configured for mounting into said second circular groove.

5. The doorlock safety chain release mechanism as claimed in claim 4, wherein said socket has a third groove therein and said third groove being configured for engaging with said ball-detent mechanism of said stem.

6. The doorlock safety chain release mechanism as claimed in claim 1, wherein said slider has a shoulder thereon and said shoulder being enclosed in, and guided along said slot of said channel.

* * * * *